(12) United States Patent
Kasturi

(10) Patent No.: US 8,510,797 B2
(45) Date of Patent: Aug. 13, 2013

(54) ONLINE USER AUTHENTICATION

(75) Inventor: Srinivas Kasturi, London (GB)

(73) Assignee: Barclays Bank PLC, London (GB)

( * ) Notice: Subject to any disclaimer, the term of this patent is extended or adjusted under 35 U.S.C. 154(b) by 51 days.

(21) Appl. No.: 13/230,225

(22) Filed: Sep. 12, 2011

(65) Prior Publication Data

US 2012/0066758 A1 Mar. 15, 2012

(30) Foreign Application Priority Data

Sep. 13, 2010 (GB) .................................. 1015212.2

(51) Int. Cl.
H04L 9/32 (2006.01)
H04L 9/00 (2006.01)

(52) U.S. Cl.
USPC .................... 726/2; 726/9; 713/185; 713/186

(58) Field of Classification Search
USPC ................. 713/150, 155, 159, 169–170, 182, 713/185–186; 726/1–9, 17–21
See application file for complete search history.

(56) References Cited

U.S. PATENT DOCUMENTS

| | | | | |
|---|---|---|---|---|
| 6,738,907 B1 * | 5/2004 | Carter | ................................ | 726/9 |
| 7,505,941 B2 * | 3/2009 | Bishop et al. | .................. | 705/67 |
| 2004/0151347 A1 | 8/2004 | Wisniewski | | |
| 2004/0188519 A1 | 9/2004 | Cassone | | |
| 2006/0010487 A1 | 1/2006 | Fierer et al. | | |
| 2006/0016877 A1 | 1/2006 | Bonalle et al. | | |
| 2007/0172114 A1 | 7/2007 | Baker et al. | | |
| 2007/0198287 A1 * | 8/2007 | Outwater | ......................... | 705/1 |
| 2008/0174100 A1 | 7/2008 | Reeves | | |
| 2008/0215346 A1 | 9/2008 | O'Cinneide et al. | | |

FOREIGN PATENT DOCUMENTS

| | | |
|---|---|---|
| GB | 2331825 | 11/1998 |
| GB | 2401462 | 4/2004 |
| WO | WO2004019190 | 3/2004 |
| WO | WO2006062998 | 6/2006 |
| WO | WO2008060725 | 5/2008 |
| WO | WO2008095178 | 8/2008 |
| WO | WO2010123621 | 10/2010 |

\* cited by examiner

*Primary Examiner* — Hosuk Song

(74) *Attorney, Agent, or Firm* — Welsh Flaxman & Gitler LLC

(57) ABSTRACT

A user establishes a verified online identity, for example by providing an identity token and biometric information, and an assurance level is established for that identity for use in an authentication service. Different assurance levels may be provided based on the degree of verification of the user's identity, for example by social network scoring, credit references, or by means of the identity token and biometric information.

25 Claims, 2 Drawing Sheets

ONLINE USER AUTHENTICATION

FIELD OF THE INVENTION

The present invention relates to online user authentication, particularly but not exclusively using an identity token.

BACKGROUND OF THE INVENTION

In any user interaction with a remote computer system over a network, it is important to verify the identity of the user. Conventionally, this is done with a user name and password, but these can often be intercepted or guessed. Greater security can be provided by means of a cryptographic token that generates a one-time password in response to local entry of the user's password. However, this still requires the user to remember the password. Typically, different tokens and/or passwords are required for different services, which is inconvenient or confusing to the user.

Furthermore, online user authentication can only be as secure as the initial process used to verify the user's identity. If a user fraudulently assumes the identity of another person and thereby obtains a secure online identity, online user authentication does not help to prevent the initial fraudulent identification.

Online transactions require varying degrees of user authentication, which are often a balance between security and convenience. For example, a social networking site may only require a user name and password, but an online banking service may additionally require a cryptographic token and/or further passwords to perform specific actions, such as a transfer of funds. Again, this is inconvenient or confusing for a user.

The Open ID protocol provides an open, decentralised standard for user authentication that allows a user to log in once and gain access to multiple systems. Open ID may be used in conjunction with secure tokens, biometrics or passwords. However, Open ID does not provide means to verify the identity of a user applying for an Open ID identity.

WO 2008/060725 (Franchi) discloses the combined use of a secure token and biometric information in a secure transaction system.

US 2009/0171836 (eBay) discloses an authentication method in which a payment provider compares an image of the user from the merchant system with a known good image of the user, which may be taken by a webcam at the time of online checkout and provided to the merchant. The payment provider system may provide an authentication service for other business in various transactions.

WO 2009/114020 (SGL Network) discloses biometric authentication of a fund transfer by comparing biometric data with a template. Weaker authentication, without biometric information, is allowed if the amount of money transferred is low. Biometric information can include facial recognition. Biometric authentication can be provided as a service to a third party.

US 2004/0151347 (Wisniewski) discloses a token with a chip or bar code, which may be used as a self-authenticating travel document, using facial recognition. The token can be used for granting access to electronic transactions, personal records etc.

WO 2006/019752 (Friendster) discloses a method of authentication by social network scoring.

STATEMENT OF THE INVENTION

According to one aspect of the invention, there is provided a method of verifying an identity of a user via a network terminal. According to another aspect of the invention, there is provided a method of verifying an identity of a user via a network terminal employing a plurality of verification options. Aspects of the invention include computer programs and computer program products for performing the methods.

Authentication of online transactions may be provided by a user presenting a token and biometric data. The token may be a contactless card that is read by a card reader integrated in the user's online terminal (e.g. a laptop or smartphone). The token may be a pre-existing form of identification, such as a passport with contactless chip. The biometric information may be a facial image from a camera, such as a webcam or camera integrated in the user's online terminal.

The authentication system may be made available as a service to other systems. The service may provide multiple levels of authentication, of which the use of a token and biometric information is the highest. Lower levels of authentication may be provided using social network scoring, or credit rating, for example. The service may provide a score representing a level of assurance of the authentication.

Online applications of the authentication service may include banking, tax returns, government services, and network or computer access.

BRIEF DESCRIPTION OF THE DRAWINGS

There now follows, by way of example only, a detailed description of embodiments of the present invention, with references to the figures identified below.

DETAILED DESCRIPTION OF THE EMBODIMENTS

Creating a High-Assurance Identity

A specific embodiment of the invention will now be described, in which a user registers for a high-assurance identity by means of network terminal 2, such as a desktop or a laptop computer, a PDA or a smartphone, connected over a network to a server. In this example, the network is the Internet, and the server provides a user interface by means of a web site accessed through browser software running on the network terminal 2.

The user holds a contactless identity token 1, such as a passport, which is readable by a near-field or contactless reader 3 integrated with or connected to the terminal 2. The terminal 2 includes a camera 4, such as a webcam, suitable for taking a still image of the user's face.

The contactless reader may communicate via a standard protocol, such as ISO14443. Biometric passports of the type now issued in the UK include a contactless chip, complying with ISO14443, which securely stores identification data including a digital facial image of the holder. Such passports provide high assurance identity tokens, since the identity of an applicant is cross-checked against government databases before the passport is issued.

In the present embodiment, by combining the ability to read a high assurance identity token, and cross checking this with other verification sources, full identity verification services can be provided remotely that improve on conventional methods by checking both the user's identity and their 'electronic footprint'.

Figure 1:
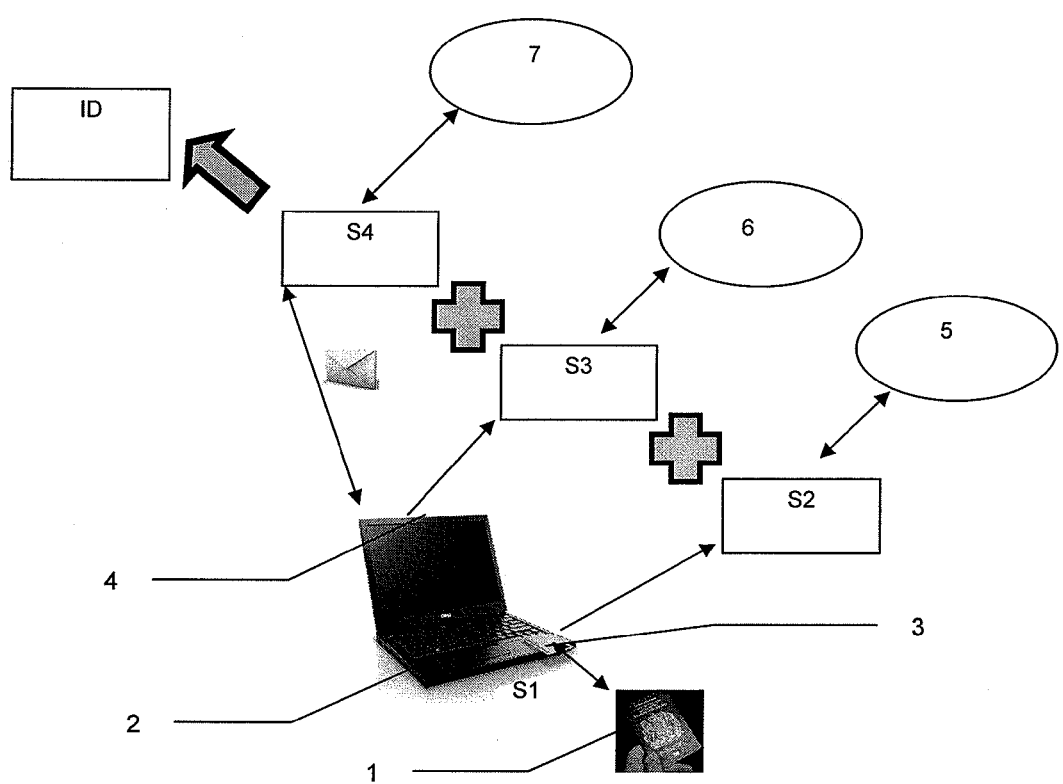
FIG. 1 is a schematic diagram of a method of creating a high-assurance identity for a user, in an embodiment of the invention.

The process by which the user creates a high-assurance online identity comprises the following steps, as illustrated in FIG. 1. First, the user goes to a website having the necessary functionality, as described below. Next, the user taps (step S1) the identity token 1 against the contactless reader 4, allowing the identification data stored on the token 1 to be passed to the website, where it may be verified (step S2) against a database 5 of known valid passports, for example.

Next, the camera 4 is used to take an image of the user, preferably both front and side profiles. The taken image is matched (step S3) with a known good image of the person identified by the identity token 1, using a facial recognition technique; this is preferably done remotely through the website, by obtaining the known good image from a database 6, although it may be done locally on the terminal 2, using the digital image stored on the identity token 1.

As an additional verification method, a confirmation token may be sent to the user offline (step S4), for example by means of a postal service or text message, using address information obtained from a database 7; for example, a passcode may be sent to the address of the registered holder of the identity token 1, obtained from electoral roll data. The user enters the confirmation token to the website to complete the creation of the high-assurance ID, which may be associated with a single designated token, such as the identity token 1 or another token securely associated with the user, such as a bank card having a contactless chip.

The user can then use the single designated token to identify themselves (e.g. tapping their contactless bank card or their passport against the contactless reader), to obtain a broad range of services which have restricted access, such as online banking, submitting tax returns, accessing government services or restricting access to corporate computers or networks, in which employees are verified as above and use a contactless token to provide verification to all access to restricted networks.

Instead of using a passport as the identity token 1, another pre-existing token could be used, such as a contactless bank card that uniquely and securely identifies the card holder. To verify that the user is the registered holder of the bank card, the user may be asked to provide the correct answer to a security question, or to provide a password used for example for online banking using the card. The bank card could be used for example as an alternative means to log into government services websites, such as for filing online self-assessment forms.

Multiple Assurance Levels

The assurance service may provide multiple levels of assurance for a user, depending on the details the user provides to verify their identity. The website that the user visits to obtain a verified identity may present the user with different options, as described below.

Level 1—no assurance. The user visits the website and registers a username and password. No verification of identity is provided.

Level 2—low assurance. The user may provide details of social networks that they belong to, such as Facebook®, MySpace®, LinkedIn® and others. An algorithm computes the quality of the social networks that the customer belongs to, and assigns a social score to the username. This is especially useful for users under the age of 18, who do not have financial relationships and other electronic footprints. This level of assurance is available to users from any country.

Level 3—medium assurance. The user may further authorise the operator of the website to carry out a reference check with credit agencies, and to use the credit agency ratings to create a reputation score for the online username. This level of assurance is available to users in all countries where a credit file check can be done.

Level 4—high assurance. The user creates a high-assurance identity, as described above.

The assurance service may create an assurance score for the user, based on the level of assurance and optionally based on details of the information used to achieve that level of assurance, as for example the social score in Level 2.

Authentication Service

The level of assurance created by the user as described above may then be provided in an authentication service to any other website supporting this service, for example by means of the OpenID standard protocol. The user may log in to any website supporting the service by means of the registered username and password, without having to register again. The website dealing with the user (or users interacting with each other on platforms such as eBay®) retrieves the assurance score for the username from the assurance service to decide the level of authorisation they want to assign to the username.

The high assurance username described above can be used for online transactions that require a high level of trust with users online. When a high assurance username is entered on a website supporting the assurance service, the user may be prompted to provide a facial image via the camera 4, which is verified against a known facial image stored by the assurance service. This verification may be performed by software on the terminal 2, which switches on the camera 4, that is, a capture device, and either sends the captured image for remote verification, or performs the verification locally at the terminal.

Computer Systems

Figure 2:
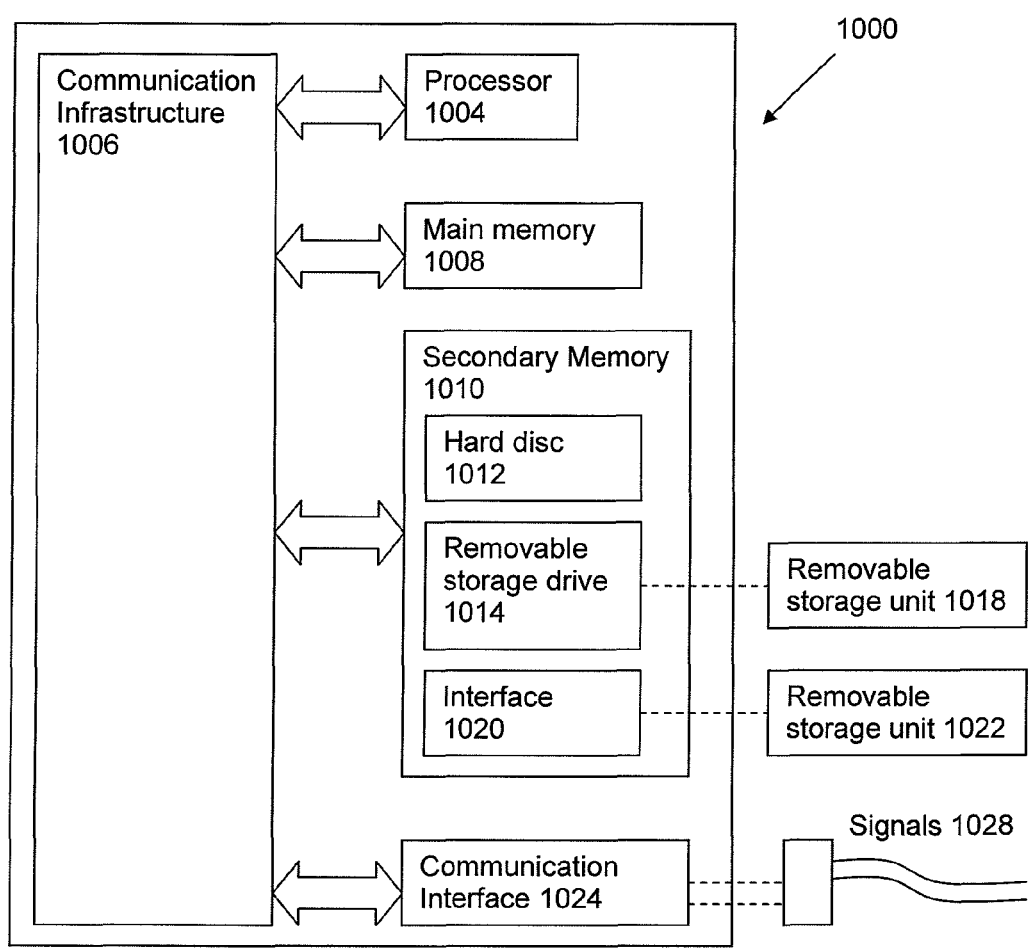
FIG. 2 is a diagram of an example of a computer system on which one or more of the functions of the embodiment may be implemented.

The entities described herein, such as the server providing the website and/or the user terminal 2, may be implemented by computer systems such as computer system 1000 as shown in FIG. 2. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 618 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternative Embodiments

Alternative embodiments may be envisaged, which nevertheless fall within the scope of the following claims. For example, the identity token 1 presented by the user may store biometric data other than a facial image, such as one or more fingerprints, retinal scans and/or iris scans. Such biometric data may be compared with biometric data of the same type obtained from the user, for example using a fingerprint, iris or retina scanner integrated with or connected to the terminal 2.

What is claimed is:

1. A method of creating a high-assurance online identity for a user via an Internet terminal, the method comprising:
    a. obtaining user identity information from a contactless identity token provided by the user, by means of a contactless reader integrated with or connected to the Internet terminal;
    b. verifying the user identity information against a remote identification database;
    c. obtaining biometric information from the user at the Internet terminal; and
    d. verifying the biometric information against known biometric information associated with the contactless identity token;
    whereby the high-assurance online identity is created for the user and is associated with the contactless identity token.

2. The method of claim 1, wherein an association between the user identity information and the contactless identity token has previously been verified.

3. The method of claim 1, wherein the known biometric information is obtained from the contactless identity token.

4. The method of claim 1, wherein the known biometric information is obtained from a remote database.

5. The method of claim 1, wherein the contactless identity token comprises a passport or blank card.

6. The method of claim 1, wherein the biometric information is obtained from the user from a capture device connected to the Internet terminal.

7. The method of claim 6, wherein the biometric information comprises one or more of a facial image, fingerprint, or retina or iris scan of the user.

8. The method of claim 1, further including:
    e. sending to the user, by other than the Internet, a confirmation token;
    f. entering the confirmation token at the Internet terminal; and
    g. verifying the confirmation token.

9. The method of claim 8, wherein the confirmation token is sent to an address corresponding to the user identity information.

10. The method of claim 1, further comprising the step of providing an authentication service based on a result arrived at based upon the step of verifying.

11. The method of claim 10, wherein the user accesses the authentication service by providing an identity token associated with the user.

12. The method of claim 11, wherein the identity token by which the user accesses the authentication service comprises the contactless identity token provided by the user at step a.

13. The method of claim 11, wherein the identity token by which the user accesses the authentication service comprises a hank card.

14. The method of claim 1, further comprising:
    providing at least one option for creating a lower level of assurance for the online identity of the user.

15. The method of claim 14, wherein the at least one option includes verification of social network information provided by the user.

16. The method of claim 14, wherein the at least one option includes verification of information provided by the user against one or more credit agencies, and the level of assurance is based on a rating for the user providing by the one or more credit agencies.

17. The method of claim 14, further comprising the step of providing an authentication service based on the high-assurance online identity.

18. The method of claim 17, wherein the authentication service includes an assurance rating of the user.

19. The method of claim 18, wherein a level of authorization is provided to the user dependent on the user's assurance rating.

20. The method of claim 17, wherein the user accesses the authentication service by providing biometric information.

21. The method of claim 20, wherein the biometric information comprises a facial image of the user.

22. The method of claim 21, wherein the facial image is obtained automatically at the Internet terminal in response to the user requesting access to the authentication service.

23. The method of claim 1, wherein the high-assurance online identity comprises an OpenID identity.

24. The method of claim 1, wherein the Internet terminal comprises one of a desktop computer, a laptop computer, a PDA or a smartphone.

25. A computer program comprising programmable code arranged to perform a method of creating a high-assurance online identity for a user via an Internet terminal, the method comprising:
 a. obtaining user identity information from a contactless identity token provided by the user, by means of contactless reader integrated with or connected to the Internet terminal;
 b. verifying the user identity information against a remote identification database;
 c. obtaining biometric information from the user at the Internet terminal; and
 d. verifying the biometric information against known biometric information associated with the contactless identity token;
 whereby the high-assurance online identity is created for the user and is associated with the contactless identity token.

\* \* \* \* \*

UNITED STATES PATENT AND TRADEMARK OFFICE
CERTIFICATE OF CORRECTION

PATENT NO. : 8,510,797 B2  
APPLICATION NO. : 13/230225  
DATED : August 13, 2013  
INVENTOR(S) : Kasturi Page 1 of 1

It is certified that error appears in the above-identified patent and that said Letters Patent is hereby corrected as shown below:

In the Claims

Column 6, lines 57-58, delete Claim 14, the text beginning with "14. The method of" and ending "of the user", and insert the following claim:

--14. The method of claim 1, further comprising providing at least one option for creating a lower level of assurance for the online identity of the user.--

Column 6, lines 63-67, delete Claim 16, the text beginning with "16. The method of" to and ending "credit agencies", and insert the following claim:

--16. The method of claim 14, wherein the at least one option includes verification of information provided by the user against one or more credit agencies, and the level of assurance is based on a rating for the user provided by the one or more credit agencies.--

Column 8, lines 1-8, delete Claim 25, the text beginning with "25. A computer program" to and ending "identity token", and insert the following claim:

--25. A computer program comprising programmable code arranged to perform a method of creating a high-assurance online identity for a user via an Internet terminal, the method comprising: a. obtaining user identity information from a contactless identity token provided by the user, by means of a contactless reader integrated with or connected to the Internet terminal; b. verifying the user identity information against a remote identification database; c. obtaining biometric information from the user at the Internet terminal; and d. verifying the biometric information against known biometric information associated with the contactless identity token; whereby the high-assurance online identity is created for the user and is associated with the contactless identity token.--

Signed and Sealed this  
Eighth Day of April, 2014

Michelle K. Lee  
*Deputy Director of the United States Patent and Trademark Office*